United States Patent
Yun et al.

(10) Patent No.: US 9,037,935 B2
(45) Date of Patent: May 19, 2015

(54) APPARATUS AND METHOD FOR RETRANSMITTING MESSAGE IN MESSAGE TRANSMISSION SYSTEM

(71) Applicant: SAMSUNG SDS CO., LTD., Seoul (KR)

(72) Inventors: Ju Seok Yun, Anyang-si (KR); Ha Jin Park, Hwaseong-si (KR); Eun Su Jang, Suwon-si (KR); Kyung Rae Jang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 103 days.

(21) Appl. No.: 14/040,853

(22) Filed: Sep. 30, 2013

(65) Prior Publication Data

US 2014/0122956 A1   May 1, 2014

(30) Foreign Application Priority Data

Oct. 25, 2012   (KR) .......................... 10-2012-0119170

(51) Int. Cl.
*H04L 1/18* (2006.01)
*H04L 1/00* (2006.01)

(52) U.S. Cl.
CPC ............ *H04L 1/1829* (2013.01); *H04L 1/1887* (2013.01)

(58) Field of Classification Search
CPC ..... H04L 1/1887; H04L 1/1848; H04L 1/188; H04L 1/18; H04L 1/1829
USPC ......... 714/748, 749, 746, 811, 814, 815, 799, 714/18, 709; 370/229, 230, 232, 235
See application file for complete search history.

(56) References Cited

U.S. PATENT DOCUMENTS

| 6,611,495 | B1* | 8/2003 | Meyer et al. ............... 370/230.1 |
| 6,694,471 | B1* | 2/2004 | Sharp ........................... 714/749 |
| 7,035,214 | B1* | 4/2006 | Seddigh et al. .............. 370/231 |
| 8,462,622 | B2* | 6/2013 | Jamp et al. ................... 370/229 |

FOREIGN PATENT DOCUMENTS

JP    4214793 B2    11/2008

* cited by examiner

*Primary Examiner* — Christine Tu
(74) *Attorney, Agent, or Firm* — Sughrue Mion, PLLC

(57) ABSTRACT

In a message retransmission apparatus, a storage unit stores store a plurality of non-transmission messages, each being assigned a respective destination device to which delivery, over a communication network, is indicated as unsuccessful. A calculation unit sets a respective retransmission time for each of the plurality of non-transmission messages. A communication unit retransmits a given non-transmission message at a given respective retransmission time a given respective destination device, and, in response to an indication that delivery of the given non-transmission message over the communication network is successful, retransmits the other non-transmission messages to the respective destination devices without waiting for the respective retransmission times thereof. Accordingly, it is possible to set retransmission periods for the plurality of non-transmission messages and retransmit only a non-transmission message of which a retransmission time arrives to the destination one by one, thereby reducing system load and enhancing retransmission efficiency.

13 Claims, 4 Drawing Sheets

APPARATUS AND METHOD FOR RETRANSMITTING MESSAGE IN MESSAGE TRANSMISSION SYSTEM

CROSS-REFERENCE TO RELATED APPLICATION

This application claims priority to and the benefit of Republic of Korea Patent Application No. 2012-0119170, filed on Oct. 25, 2012, the disclosure of which is incorporated herein by reference in its entirety.

BACKGROUND

1. Field of the Invention

The present invention relates to an apparatus and method for retransmitting a message, and more particularly, to an apparatus and method for retransmitting a message that has failed to be transmitted by a source device in a message transmission system for transmitting a message from a source device to a destination device over a communication network.

2. Discussion of Related Art

In a message transmission system in which a plurality of terminals and a server are connected with each other over a wireless network, message transmission may be performed between a terminal and a server, and between terminals. The source device or the source indicates a terminal or server that generates and transmits a message upon an application's request, and the destination device or the destination indicates a terminal or server that receives the message and forwards it to the application.

In this case, even when the destination is unable to receive a message due to the state of the destination, the source may not be aware of the state and thus may have low message retransmission efficiency. This causes a problem that a message is repeatedly transmitted. In particular, this problem occurs when the destination is a terminal.

The conventional technology for retransmitting a message when the message fails to be transmitted is passive. For example, the message is retransmitted when a response is not received from a destination in a certain time period after a source has transmitted a message or when a retransmission request is received from the destination. In this case, if a plurality of messages are needed to be transmitted to the same destination, all the plurality of messages should be retransmitted. This causes a problem of increasing a system load.

Japanese Patent No. 4214793 discloses a method of determining retransmission timeout used in a wireless communication system. In detail, according to the method, the retransmission timeout is calculated by monitoring a packet round trip time, which is the difference between a time when transmission data is transmitted and a time when acknowledgement is received. However, a processing method when a plurality of pieces of transmission data are transmitted is not disclosed and thus it is difficult to improve retransmission efficiency.

SUMMARY OF THE INVENTION

The present invention is directed to an apparatus and method for retransmitting a message in a message transmission system for efficiently retransmitting a plurality of non-transmission messages that have failed to be transmitted from a message source to the same destination.

The present invention is also directed to a computer readable recording medium storing a computer program for executing a method of retransmitting a message in a message transmission system for efficiently retransmitting a plurality of non-transmission messages that have failed to be transmitted from a message source to the same destination.

According to an aspect of the present invention, there is provided a message retransmission apparatus including: a storage unit configured to store a plurality of non-transmission messages, each being assigned a respective destination device to which delivery, over a communication network, is indicated as unsuccessful; a calculation unit configured to set a respective retransmission time for each of the plurality of non-transmission messages; a communication unit configured to retransmit a given non-transmission message at a given respective retransmission time a given respective destination device, and, in response to an indication that delivery of the given non-transmission message over the communication network is successful, retransmit the other non-transmission messages to the respective destination devices without waiting for the respective retransmission times thereof; and a hardware processor implementing at least one of the calculation unit and the communication unit.

According to another aspect of the present invention, there is provided a message retransmission method including: (a) storing a plurality of non-transmission messages, each being assigned a respective destination device to which delivery, over a communication network, is indicated as unsuccessful; (b) setting a respective retransmission time for each of the plurality of non-transmission messages; (c) retransmitting a given non-transmission message at a given respective retransmission time to a given respective destination device; and (d) in response to an indication that delivery of the given non-transmission message over the communication network is successful, retransmitting the other non-transmission messages to the respective destination devices without waiting for the respective retransmission times thereof; wherein at least one of (a), (b), (c), and (d) is carried out by a hardware processor.

According to the apparatus and method for transmitting data of the present invention, it is possible to set retransmission periods for the plurality of non-transmission messages and retransmit only a non-transmission message of which a retransmission time arrives to the destination one by one, thereby reducing system load and enhancing retransmission efficiency.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, an apparatus and method for retransmitting a message in a message transmission system according to an exemplary embodiment of the present invention will be described in detail with reference to the accompanying drawings.

Figure 1:
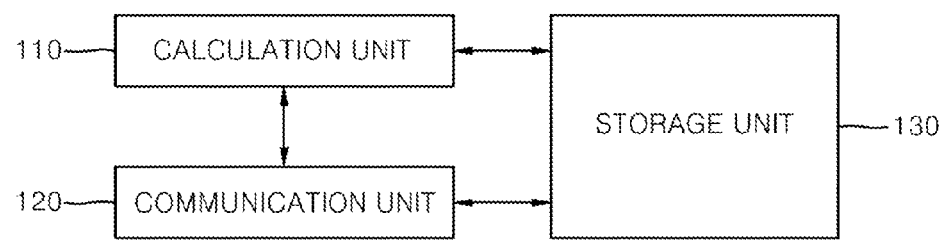
FIG. 1 is a block diagram showing a configuration of a message retransmission apparatus in a message transmission system according to an exemplary embodiment of the present invention.

FIG. 1 is a block diagram showing a configuration of a message retransmission apparatus in a message transmission system according to an exemplary embodiment of the present invention.

Referring to FIG. 1, the message retransmission apparatus according to the present invention includes a calculation unit 110, a communication unit 120, and a storage unit 130, and allows a terminal or server which is a source of the message transmission system to retransmit a message that has failed to be transmitted, to a destination.

Figure 2:
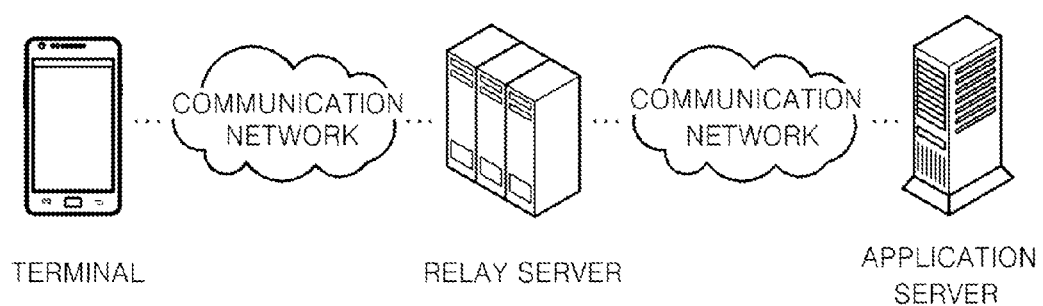
FIG. 2 is a view showing an entire configuration of the message transmission system.

FIG. 2 is a view showing an entire configuration of the message transmission system, where the message transmission system includes a terminal, a relay server, and an application server that are connected over a wireless network. In an example in FIG. 2, an application server which is a source transmits a message to a terminal which is a destination. However, the message retransmission apparatus according to the present invention is not limited thereto, and may be applied to a case in which the source is a terminal and the destination is an application server or a case in which both the source and destination are terminals.

The relay server functions to relay transmission of a message between the application server and the terminal, and may inform of a receivable state of the terminal which is a destination to an application server when the terminal that was disconnected from the relay server reconnects to the relay server, to allow the application server to retransmit a non-transmission message that has failed to be transmitted by the application server.

When transmission of a message from a message source to a message destination fails, that is, the source does not receive an ACK message which is a response message from the destination in a certain time period after the source transmits a message, the communication unit 120 of the message retransmission apparatus in the source stores the message as a non-transmission message to the storage unit 130. In other words, for a non-transmission message, successful delivery is unconfirmed.

Furthermore, the storage unit 130 may also store the number of transmission failures of a non-transmission message and a retransmission period set corresponding to the non-transmission message. The retransmission period is set by the calculation unit 110 on the basis of the number of transmission failures.

Specifically, the calculation unit 110 sets a minimum period which is an initial value of the retransmission period and increases the retransmission period by a certain multiple (for example, two) from the minimum period whenever the number of transmission failures increases. However, the increased retransmission period may be set not to exceed a previously set maximum period, thereby maintaining the retransmission efficiency. Alternatively, the retransmission period may be increased from the minimum period by a certain amount or an uncertain ratio. The retransmission period may be set in a variety of different ways, depending on the particular implementation. For example, the retransmission period may be indicated by a parameter that gives an amount of time that must pass until the retransmission is attempted. On the other hand, the retransmission period may be indicated by a parameter that gives a specific time at which the retransmission of the message is attempted. Still other concrete implementations are possible. All of these various exemplary embodiments may be referred to, in a more general sense, as embodiments in which a given message is retransmitted when its respective retransmission time has arrived.

Also, the storage unit 130 may store a plurality of non-transmission messages that have failed to be transmitted to the same destination. In this case, the calculation unit 110 separately sets the retransmission period for each non-transmission message.

The communication unit 120 transmits one non-transmission message of which a retransmission time, according to the retransmission period, which is set independently, arrives among a plurality of non-transmission messages stored in the storage unit 130 to the destination as a retransmission message. That is, the communication unit 120 transmits the plurality of non-transmission messages to the destination one by one in the arriving order of the retransmission times of the non-transmission messages.

For example, if the storage unit 130 stores non-transmission messages A, B, and C that fail to be transmitted to the same destination, non-transmission messages A, B, and C have retransmission periods set independently of each other. The communication unit 120 transmits non-transmission message B having the earliest retransmission time among non-transmission messages A, B, and C and then non-transmission message A having the second earliest retransmission time to the destination as the retransmission message. If an ACK message is not received from the destination during the retransmission period after non-transmission message B is retransmitted, the calculation unit 110 resets the retransmission period of non-transmission message B.

When the communication unit 120 receives an ACK message corresponding to any non-transmission message from the destination while retransmitting the non-transmission messages of which retransmission messages arrive to the destination as retransmission messages one by one, the communication unit 120 transmits all the non-transmission messages stored in the storage unit 130 at once. This is because the communication unit 120 confirms that the destination is in a receivable state by receiving the ACK message from the destination.

Here, the case in which the communication unit 120 confirms that the destination is in a receivable state to transmit the plurality of non-transmission messages at once may include receiving the ACK message corresponding to the non-transmission message, transmitting a message newly generated by the source instead of the non-transmission message to receive an ACK message corresponding to the message, and receiving a new message from the destination.

If the message transmission has failed until the retransmission period reaches the maximum period or the number of retransmissions of the non-transmission message reaches a predetermined reference number, the communication unit 120 may stop transmitting of the non-transmission message and delete the message from the storage unit 130. Alternatively, the communication unit 120 may stop transmitting of the non-transmission message and delete the message from the storage unit 130 if a time to live (TTL) of the non-transmission message has elapsed until the retransmission period reaches the maximum period, or a user requests cancellation of the transmission.

As such, the message retransmission apparatus according to the present invention may set retransmission periods for a plurality of non-transmission messages and retransmit only non-transmission messages of which retransmission times arrive to the destination one by one, thereby reducing system load and enhancing retransmission efficiency.

Further, the source may fail to transmit messages to a plurality of destinations. In this case, the storage unit 130 stores non-transmission messages corresponding to the plurality of destinations and the communication unit 120 performs the above-described retransmission process on each destination. That is, the communication unit 120 determines a receivable state of the destination while transmitting non-transmission messages of which retransmission times corresponding to the plurality of destinations arrive one by one, and transmits at once all the non-transmission messages to a destination determined to be receivable by receiving the ACK message. In this case, the communication unit 120 may transmit each message before its retransmission time of the message.

Figure 3:
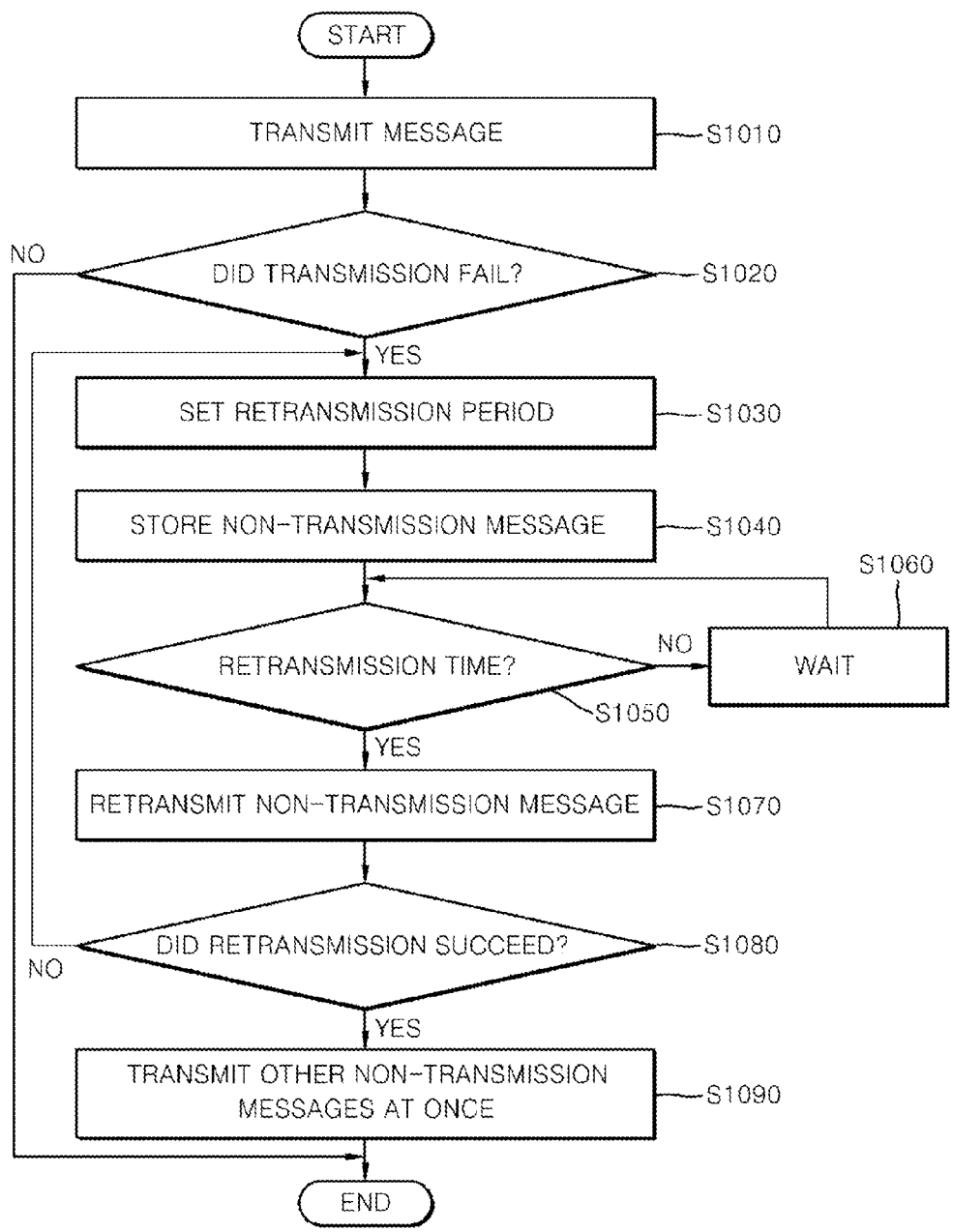
FIG. 3 is a flowchart showing a message retransmission method in the message transmission system according to an exemplary embodiment of the present invention.

FIG. 3 is a flowchart showing a message retransmission method in the message transmission system according to an exemplary embodiment of the present invention.

Referring to FIG. 3, when the source first transmits a message to the destination (S1010) in the message transmission system and then the message transmission fails (S1020), the calculation unit 110 sets the retransmission period for the message for which transmission has failed (S1030), and the storage unit 130 stores the message (S1040).

Next, the communication unit 120 transmits a non-transmission message of which a retransmission time arrives (S1050) among the non-transmission messages stored in the storage unit 130 to a destination as a retransmission message (S1070). If there is no non-transmission message of which a retransmission time arrives, the communication unit 120 waits until the retransmission time arrives (S1060).

If message retransmission succeeds and an ACK message is received from the destination within the retransmission period after transmitting a retransmission message (S1080), the communication unit 120 transmits other non-transmission messages stored in the storage unit 130 to the destination at once (S1090). However, if the communication unit 120 does not receive the ACK message during the retransmission period after transmission of the retransmission message, the calculation unit 110 resets the retransmission period (S1030), and the storage unit 130 stores the retransmission message as the non-transmission message (S1040).

Figure 4:
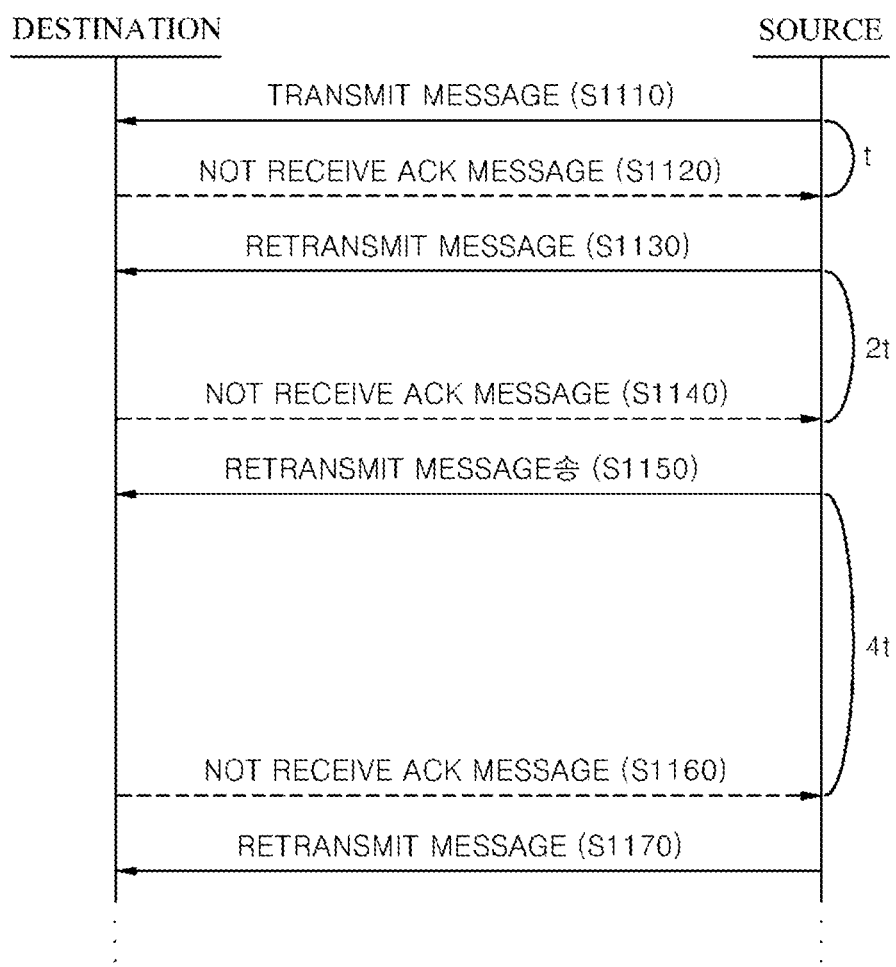
FIG. 4 is a view showing an example of setting a retransmission period as the number of message retransmissions from a message source to a message destination increases.

FIG. 4 is a view illustrating an example of setting a retransmission period as the number of message retransmissions from a message source to a message destination increases.

Referring to FIG. 4, when the source first transmits a message (S1110) and then does not receive an ACK message from the destination during a first retransmission period t (S1120), the source retransmits the message (S1130). Also, since the message transmission fails, the retransmission period corresponding to the message is double to 2t. Next, if the ACK message is not received from the destination during the retransmission period 2t (S1140), the source retransmits a message (S1150), and the retransmission period increases to 4t. If the ACK message is not received during 4t (S1160), the source retransmits the message (S1170).

The above process is performed until the retransmission period reaches the maximum period or the retransmission number reaches the maximum number. Unlike this, the retransmission may be performed during a message TTL for the maximum period. When the terminal is determined to be in a state capable of receiving a message (that is, when the terminal connects to a server, when an ACK or message for a previous message is received from the terminal, etc.), all messages waiting for transmission are transmitted to the terminal.

Figure 5:
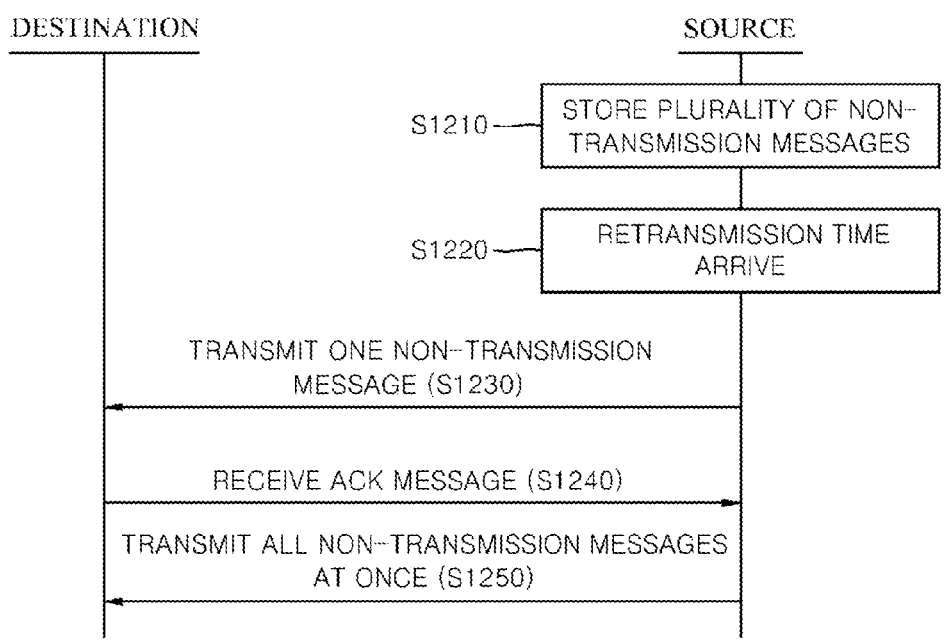
FIG. 5 is a flowchart showing a process of retransmitting a message between a destination and source of the message transmission system.

FIG. 5 is a flowchart showing a process of retransmitting a message between a destination and source of the message transmission system.

Referring to FIG. 5, the source stores a plurality of non-transmission messages (S1210), and the source transmits one non-transmission message of which a retransmission time arrives among the plurality of non-transmission messages to the destination as a retransmission message (S1230). Next, when the source receives an ACK message from the destination, the source transmits all non-transmission messages at once (S1250).

The invention can also be embodied as computer-readable codes on a computer-readable recording medium. The computer-readable recording medium is any data storage device that can store data which can be thereafter read by a computer system. Examples of the computer-readable recording medium, in non-transitory form, include a ROM, a RAM, a CD-ROM, a magnetic tape, a floppy disk, and an optical data storage. Further, the recording medium may be implemented in a transitory form of carrier waves such as are used in Internet transmission. The computer-readable recording medium can also be distributed over computer systems connected through a wired/wireless communication network so that the computer-readable code is stored and executed in a distributed fashion. A computer system, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

What is claimed is:

1. A message retransmission apparatus comprising:
a storage unit configured to store a plurality of non-transmission messages, each being assigned a respective destination device to which delivery, over a communication network, is indicated as unsuccessful;
a calculation unit configured to set a respective retransmission time for each of the plurality of non-transmission messages;
a communication unit configured to retransmit a given non-transmission message at a given respective retransmission time a given respective destination device, and, in response to an indication that delivery of the given non-transmission message over the communication network is successful, retransmit the other non-transmission messages to the respective destination devices without waiting for the respective retransmission times thereof; and a hardware processor implementing at least one of the calculation unit and the communication unit.

2. The message retransmission apparatus of claim 1, wherein the calculation unit is further configured to set the respective retransmission time, for each of the plurality of non-transmission messages, by setting a respective retransmission period, and to set the respective retransmission period to increase as a count of respective retransmission failures increases.

3. The message retransmission apparatus of claim 2, wherein the calculation unit is further configured to set the respective retransmission period to increase by a multiple N of a predetermined minimum retransmission period, up to a predetermined maximum retransmission period, in response to an indication that delivery over the communication network is unsuccessful, where N is a positive real number.

4. The message retransmission apparatus of claim 1, wherein the storage unit is further configured to store, for each of the plurality of non-transmission messages, a respective value representing a count of respective retransmission failures.

5. The message retransmission apparatus of claim 1, wherein some of the plurality of non-transmission messages, being assigned different destination devices respectively, and the communication unit is further configured to retransmit the plurality of non-transmission messages to the respective destination devices.

6. The message retransmission apparatus of claim 1, wherein the communication unit is further configured to retransmit the plurality of non-transmission messages via a relay server of the communication network.

7. A message retransmission method comprising:
 (a) storing a plurality of non-transmission messages, each being assigned a respective destination device to which delivery, over a communication network, is indicated as unsuccessful;
 (b) setting a respective retransmission time for each of the plurality of non-transmission messages;
 (c) retransmitting a given non-transmission message at a given respective retransmission time to a given respective destination device; and
 (d) in response to an indication that delivery of the given non-transmission message over the communication network is successful, retransmitting the other non-transmission messages to the respective destination devices without waiting for the respective retransmission times thereof;

wherein at least one of (a), (b), (c), and (d) is carried out by a hardware processor.

8. The message retransmission method of claim 7, wherein (b) includes setting the respective retransmission time, for each of the plurality of non-transmission messages, by setting a respective retransmission period, and setting the respective retransmission period to increase as a count of respective retransmission failures increases.

9. The message retransmission method of claim 8, wherein, in (b), the respective retransmission period is set to increase by a multiple N of a predetermined minimum retransmission period, up to a predetermined maximum retransmission period, in response to an indication that delivery over the communication network is unsuccessful, where N is a positive real number.

10. The message retransmission method of claim 7, further comprising (e) storing, for each of the plurality of non-transmission messages, a respective value representing a count of respective retransmission failures.

11. The message retransmission method of claim 7, wherein some of the plurality of non-transmission messages, each being assigned different destination device respectively, and the plurality of non-transmission messages is retransmitted to the respective destination devices, respectively.

12. The message retransmission method of claim 7, wherein the retransmitting of the plurality of non-transmission messages is performed via a relay server of the communication network.

13. A non-transitory computer-readable media having recorded thereon instructions adapted to enable a hardware processor of a computer system to implement the operations of:
 storing a plurality of non-transmission messages, each being assigned a respective destination device to which delivery, over a communication network, is indicated as unsuccessful;
 setting a respective retransmission time for each of the plurality of non-transmission messages;
 retransmitting a given non-transmission message at a given respective retransmission time to a given respective destination device; and
 in response to an indication that delivery of the given non-transmission message over the communication network is successful, retransmitting the other non-transmission messages to the respective destination devices without waiting for the respective retransmission times thereof.

* * * * *